United States Patent [19]

Mihic

[11] Patent Number: 4,973,204
[45] Date of Patent: Nov. 27, 1990

[54] ARRANGEMENT IN CUTTING INSERTS, ESPECIALLY FOR TURNING TOOLS

[76] Inventor: Wlajko Mihic, Tegnervägen 9, S-802 28 Gävle, Sweden

[21] Appl. No.: 457,725
[22] PCT Filed: Aug. 8, 1988
[86] PCT No.: PCT/SE88/00399
  § 371 Date: Jan. 11, 1990
  § 102(e) Date: Jan. 11, 1990
[87] PCT Pub. No.: WO89/01375
  PCT Pub. Date: Feb. 23, 1989

[30] Foreign Application Priority Data

Aug. 7, 1987 [SE] Sweden ................. 8703085

[51] Int. Cl.$^5$ .......................................... B23B 27/08
[52] U.S. Cl. ..................................... 407/116; 407/117
[58] Field of Search ............ 407/116, 117, 115, 114

[56] References Cited

U.S. PATENT DOCUMENTS

4,776,733 10/1988 Petterson ................. 407/116
4,778,311 10/1988 Niemi ....................... 407/116

FOREIGN PATENT DOCUMENTS

022951 5/1987 European Pat. Off. .
0245225 11/1987 European Pat. Off. .

Primary Examiner—William E. Terrell
Assistant Examiner—S. Keating Johns
Attorney, Agent, or Firm—Mattern, Ware, Stoltz & Fressola

[57] ABSTRACT

A cutting insert, especially for turning tools, comprising an insert body having a transverse front cutting edge portion and a rear portion for mounting on and clamping to an insert holder, a cutting surface which connects with said cutting edge being provided with a central chip-forming recess. The novelty of the invention resides in that the chip-forming recess has a concave bottom surface which connects with the transverse cutting edge and with the rest of the cutting surface at a distance from said cutting edge, and that said recess is laterally restricted by inclined, convex sides having a curvature and shape relative to the concave bottom surface such that the bottom surface width at first decreases, as seen in the direction away from the cutting edge and backwards, and then increases again.

2 Claims, 1 Drawing Sheet

2

ARRANGEMENT IN CUTTING INSERTS, ESPECIALLY FOR TURNING TOOLS

BACKGROUND OF THE INVENTION

The present invention relates generally to an arrangement in cutting inserts and more particularly to an arrangement in cutting inserts for turning tools.

In turning with conventional tools, axial turning in lateral direction, facing etc are carried out by means of a cutting insert, and severing and deep radial and axial plunge cutting by means of a recessing tool.

A characteristic feature of cutting inserts and recessing tools is their small extent in axial direction. The small width prevents unnecessary waste of material during severing and facilitates plunge cutting of grooves of smaller width.

Recessing tools frequently cause difficulties, especially with "difficult" materials, in that the chips may wedge in the groove and be carried along, damaging both to the tool and the workpiece.

SUMMARY OF THE INVENTION

One object of the invention is to provide a cutting insert designed to improve chip-forming and guiding in a variety of materials of different workability, the chips being guided away from the cutting area and gradually broken up, such that the risk of tool damages or deterioration of quality is reduced.

A conventional tool for axial turning or facing can be of large extent in axial direction and cannot be used for severing or plunge cutting. In normal turning work, it is therefore necessary to use several types of tools. Another object of the invention is to provide a cutting insert which can be used both for radial plunge cutting, severing, axial plunge cutting and for axial turning in lateral direction, facing and copy-turning, i.e. a cutting insert which can operate in all directions in the plane under production conditions.

A still further object is to provide a cutting insert which can also be used for turning of materials which normally require a large positive rake, for example high alloy stainless steel, acidproof steel, heat-resisting steel and non-ferrous metals such as aluminium, copper, brass etc.

BRIEF DESCRIPTION OF THE DRAWINGS

A preferred embodiment of the cutting insert according to the invention will be described in detail with reference to the accompanying drawing which shows a greatly enlarged cutting insert. In the drawing.

DETAILED DESCRIPTION OF THE INVENTION

Figure 1:
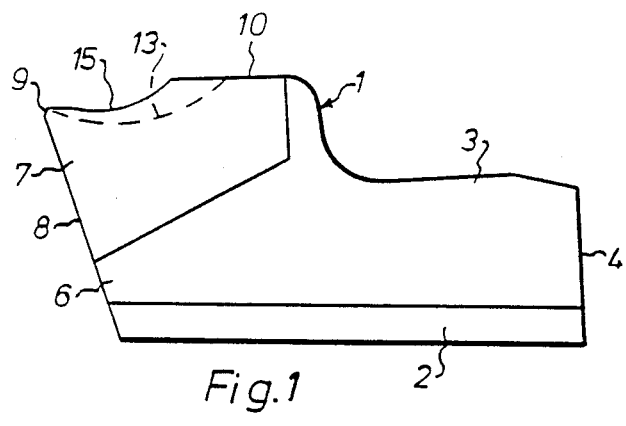
FIG. 1 is a side view of the preferred embodiment of the cutting insert.
Figure 2:
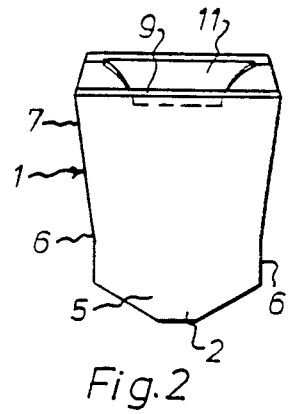
FIG. 2 is a view from the cutting edge end of the same cutting insert.
Figure 3:
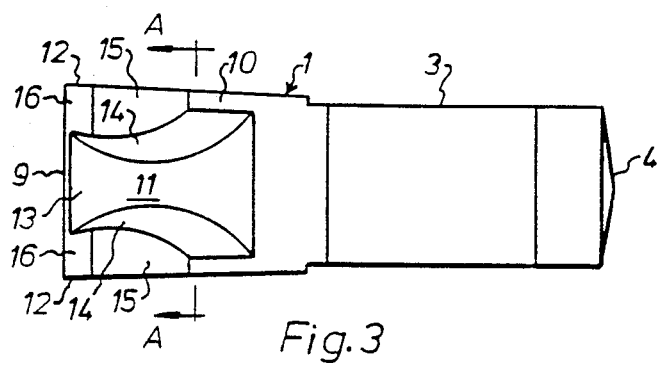
FIG. 3 is a top plan view of the cutting insert.
Figure 4:
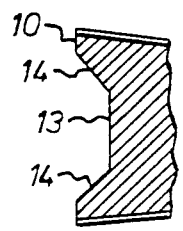
FIG. 4 is a cross-sectional view taken along line A—A in FIG. 3.

The cutting insert comprises, in the embodiment shown, a body of so-called cutting alloy or sintered material. The lower side of the cutting insert 1 is formed with a longitudinal ridge 2 to be received in a complementary groove in a recess formed in a cutting insert holder. The rear portion 3 of the cutting insert consists of a projection which is lower than the rest of the cutting insert, and the surface of this projection extending substantially in parallel with the lower side is adapted to form an abutment for a clamping arm mounted on the cutting insert holder and actuated by a screw or the like to keep the cutting insert stable in the groove of the holder, the rear end surface 4 of the cutting insert being engaged with the rear wall of the recess of the holder. The lower portion 5 of the cutting insert, which also comprises the projection 3 has substantially parallel lateral surfaces 6, but at the front portion of the cutting insert, the lateral surfaces 7 diverge upwardly such that the lateral surfaces at the main section of the insert body portion ahead of the projection 3 are inclined outwardly, as seen from the underside. Also the front end surface 8 of the cutting insert is inclined outwardly, as seen in the same direction. The major cutting edge 9 of the cutting insert is formed at the upper edge of the front end surface 8 of the insert body at the location where this end surface meets the cutting surface 10. As seen from the major cutting edge 9, the cutting insert also has a rearwardly directed taper to allow clearance.

According to the invention, the cutting surface is formed at its center portion with a recess 11 which is designed to allow efficient chip forming and chip breaking. On both sides of the recess, the cutting surface parts which are closest to the major cutting edge, have lateral edges designed to form lateral cutting edges 12.

The recess 11 formed in the cutting surface has a concave bottom surface 13 whose front end connects with the center portion of the major cutting edge 9 and whose rear end connects with the cutting surface 10, and convex surfaces 14 which are outwardly inclined as seen from the bottom, such that the concave bottom surface 13, starting from the end connecting with the major cutting edge, has a width which at first successively decreases and then successively increases.

The wall portions defining the recess 11 in the lateral direction are formed with recesses 15 which are also concave and extend perpendicular to the longitudinal direction of the cutting insert and which are shorter and more curved than the bottom 13 of the recess 11.

The recesses 15 which are aligned with one another thus cut away arcuate areas at the sides of the central recess 11.

The front section of the remaining cutting surface is formed of substantially planar areas 16 which connect with the major and lateral cutting edges 9 and 12 and are of small extent in the longitudinal direction of the cutting insert. The front end of the concave bottom 13 is located between said planar areas.

The inclined convex sides 14 of the recess 11 which are cut by the concave lateral recesses 15, are designed such that the upper and lower edges of each side converge adjacent the major cutting edge 9.

The bottom 13 and sides 14 of the central recess 11 extend, at their rear end, beyond the lateral recesses 15 which have a smaller radius than the concave bottom 13 of the central recess 11.

When a chip is cut during severing and slotting, the chip sides will strike and be guided by the areas 16 and the concave lateral recesses 15 and be bent in a smaller radius, while the chip center extends into the central recess 11 which directly connects with the major cutting edge 9, and is bent in a larger radius, at the same time as a certain compression occurs in the transverse direction of the chip under the action of the convex lateral surfaces 14. The heavy deformation in both longitudinal and transverse direction of the chip, and the transfer of material in the chip caused by the deformation, imply that the chip unwinds from its helical shape and is gradually broken up, simultaneously as the chip width is reduced because of the transverse bending of the chip and the transfer of material towards the center of the chip, such that the wound-up chip goes clear of the sides of the groove.

In copy-turning and facing operations and in turning in lateral direction, efficient chip flow and break-up are obtained in all the materials mentioned above. When direct cutting is begun, the chips will strike one of the concave surfaces of the lateral recess 15 formed at the sides of the cutting insert, which means that the chips are guided away from the cutting area and are gradually broken up.

Since the cutting insert according to the invention gives the desired guiding, forming and breaking of chips during plunge cutting, with no risk that long chips collect adjacent the cutting area, the same cutting insert can be used for severing, copy-turning, lateral turning and facing in axial and axial/radial direction under production conditions, which has not proved possible with prior art cutting inserts.

The invention is not restricted to that described above and shown in the drawing, but can be modified in various ways within the scope of the appended claims.

What is claimed is:

1. An arrangement in a cutting insert, especially for turning tools, comprising an insert body (1) having a substantially transverse front portion provided with a transverse cutting edge, and a rear portion (3) to be mounted on and clamped to an insert holder, a cutting surface (10) which connects with said cutting edge (9) being formed with a central chip-forming recess (11), wherein said chip-forming recess (11) has a concave bottom surface (13) which is arcuately curved about an axis extending substantially in parallel with said cutting edge and whose front end connects with a center portion of the transverse cutting edge (9) and whose rear end connects with the cutting surface (10) spaced from said cutting edge, characterized in that said recess (11) is bounded by inclined, convex sides (14), each said inclined, convex side having upper and lower edges and such a curvature and shape relative tot he concave bottom surface (13) that the lower edges of each side substantially converge adjacent the concave bottom surface connecting with said cutting edge (9) while the lower edge of each side defines the bottom surface in lateral direction, so that the bottom surface at first decreases, as seen in the direction away from said cutting edge and backwards, and then increases again, and in that portions of the cutting edge on both sides of the cutting edge portion connecting with said concave bottom surface (13) adjoin substantially planar areas (16) of the cutting surface (10), and said planar areas have laterally facing edges designed as lateral cutting edges (12) which enable turning also in a direction parallel to the transverse cutting edge.

2. The arrangement as claimed in claim 1, characterized in that surfaces on both sides of the central recess (11) are formed with transverse recess (15) which are arcuately curved about an axis substantially in parallel with said cutting edge (9) and have a larger curvature than said bottom surface (13) of the central recess, and which connect forwardly with the substantially planar areas (16) along the cutting edge on both sides of the central recess (110 and connect backwardly with the cutting surface (10) closer to the cutting edge (9) than the rear end of said bottom surface of the central recess does.

* * * * *

UNITED STATES PATENT AND TRADEMARK OFFICE
CERTIFICATE OF CORRECTION

PATENT NO. : 4,973,204
DATED : Nov. 27, 1990
INVENTOR(S) : Wlajko Mihic

It is certified that error appears in the above-identified patent and that said Letters Patent is hereby corrected as shown below:

Col. 4, line 9, "tot he" should be --to the--.

Col. 4, line 32, "(110" should be --(11)--.

Signed and Sealed this

Seventh Day of July, 1992

*Attest:*

DOUGLAS B. COMER

*Attesting Officer*     *Acting Commissioner of Patents and Trademarks*